United States Patent
Jones et al.

(10) Patent No.: US 7,175,723 B2
(45) Date of Patent: Feb. 13, 2007

(54) STRUCTURE HAVING NANO-FIBERS ON ANNULAR CURVED SURFACE, METHOD OF MAKING SAME AND METHOD OF USING SAME TO ADHERE TO A SURFACE

(75) Inventors: Steven D. Jones, Lafayette, CA (US); Ronald S. Fearing, El Cerrito, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/958,476

(22) Filed: Oct. 4, 2004

(65) Prior Publication Data
US 2005/0092414 A1    May 5, 2005

Related U.S. Application Data

(60) Provisional application No. 60/508,329, filed on Oct. 3, 2003.

(51) Int. Cl.
*B32B 31/00* (2006.01)
*B60C 11/00* (2006.01)
*A43B 13/22* (2006.01)

(52) U.S. Cl. .................. 156/60; 36/59 C; 152/209.4; 152/212; 156/160; 428/92

(58) Field of Classification Search .............. 156/60, 156/160; 152/209.4, 212; 36/59 C; 428/92
See application file for complete search history.

(56) References Cited

U.S. PATENT DOCUMENTS

| | | | |
|---|---|---|---|
| 3,084,732 A | * | 4/1963 | Kronstein .............. 152/212 |
| 4,356,643 A | * | 11/1982 | Kester et al. .............. 36/59 C |
| 4,545,831 A | | 10/1985 | Ornstein |
| 5,264,722 A | | 11/1993 | Tonucci et al. |
| 5,392,498 A | | 2/1995 | Goulait et al. |
| 5,843,657 A | | 12/1998 | Liotta et al. |
| 5,843,767 A | | 12/1998 | Beattie |
| 5,951,931 A | | 9/1999 | Murasaki et al. |
| 5,959,200 A | | 9/1999 | Chui et al. |
| 6,055,680 A | | 5/2000 | Tolbert |

(Continued)

FOREIGN PATENT DOCUMENTS

WO    WO-99/32005    7/1999

(Continued)

OTHER PUBLICATIONS

Spice, post-gazette.com Health & Science, "Scientists unravel mystery of geckos' sticky feet", Jul. 2003.*

(Continued)

*Primary Examiner*—Steven D. Maki
(74) *Attorney, Agent, or Firm*—Morrison & Foerster LLP

(57) ABSTRACT

A curved surfaces for adhering to contact surfaces is provided. The structure includes a curved surface with a plurality of nano-fibers disposed thereon. When the curved surface is in a first position, at least one of the plurality of nano-fibers contacts the contact surface and provides an adhesive force at the contact surface. When the curved surface rotates to a second position from the first position, the at least one of the plurality of nano-fibers is leveraged way from the contact surface.

38 Claims, 6 Drawing Sheets

U.S. PATENT DOCUMENTS

| | | | |
|---|---|---|---|
| 6,393,327 B1 | 5/2002 | Scribner | |
| 6,713,151 B1 | 3/2004 | Dean et al. | |
| 6,737,160 B1* | 5/2004 | Full et al. | 428/400 |
| 6,872,439 B2* | 3/2005 | Fearing et al. | 428/343 |
| 2002/0100581 A1 | 8/2002 | Knowles et al. | |
| 2003/0124312 A1 | 7/2003 | Autumn | |
| 2004/0005454 A1* | 1/2004 | Full et al. | 428/343 |
| 2004/0009353 A1 | 1/2004 | Knowles et al. | |
| 2004/0071870 A1 | 4/2004 | Knowles et al. | |
| 2004/0076822 A1 | 4/2004 | Jagota et al. | |
| 2005/0072509 A1 | 4/2005 | Full et al. | |
| 2005/0181170 A1 | 8/2005 | Fearing et al. | |

FOREIGN PATENT DOCUMENTS

| | | | |
|---|---|---|---|
| WO | WO 01/49776 | * | 7/2001 |
| WO | WO-03/095190 | | 11/2003 |

OTHER PUBLICATIONS

Janra, Kuro5hin, "Gecko feet in-hair-ently sticky (Science)", Oct. 2002.*

"Janra II from archive.org Oct. 20, 2002", web.archive.org/web/20021020025333/http://www.kuro5hin.org.*

"Janra III from archive.org Dec. 11, 2002", web.archive.org/web/20021211013553/http://www.kuro5hin.org/story/2002/10/18/03840/816.*

Fearing et al., pending U.S. Appl. No. 11/143,372, filed Jun. 1, 2005.

Autumn, Keller et al., (Jun. 8, 2000) "Adhesive force of a single gecko foot-hair," Nature, 405: 681-658.

Cartmill, Matt (1985) "Chapter 5: Climbing," in *Functional Vertebrate Morphology*, M. Hildebrand et al. eds., Belknap Press of Harvard University Press, Cambridge, MA.

Edwards, John S. (Oct. 1962) "Observations on the development and predatory habit of two *reduviid heteroptera, phinocoris Carmelita stal* and *platymeris rhadamanthus gerst*," Proc. R. Ent. Soc. Lond., 37(7-9): 89-98.

Edwards, John S. et al., (1970) "The adhesive pads of Heteroptera: a re-examination," Proc. R. ent. Socl. Lond. 45(1-3): 1-5.

Hora, Sunder Lal (1923) "The Adhesive Apparatus on the Toes of certain Geckos and Tree-frogs," Journal of the Asiatic Society of Bengal 9: 137-145.

Irschick, Duncan J. et al., (1996) "A comparative analysis of clinging ability among pad-bearing lizards," Biological Journal of the Linnean Society, 59: 21-35.

Liang, Yiching A. et al., (Jun 2000) "Adhesion Force Measurements on single Gecko Setae," Technical Digest of the 2000 Solid-State Sensor and Actuator Workshop, Jun. 4-8, 2000, Hilton Head Island, SC, pp. 33-38.

Maderson, P. F. A. (Aug. 15, 1964) "Keratinized Epidermal Derivatives as an Aid to Climbing in Gekkonid Lizards," Nature, 203: 780-781.

Mahendra, Beni Charan, (1941) "Contributions to the Bionomics, Anatomy, Reproduction and Development of the Indian House-Gecko, *Hemidactylus Flaviviridis Ruppel*," Proceedings of the Indian Academy of Science, 13(5) Sec. B: 288-306.

Paul, Robert C. et al., (Oct. 21, 1999) "How do flies and other insects walk up walls, ceilings and even apparently smooth glass windows?" <http://www.sciam.com/askexpert_question.cfm?articleID=00053735-601D-1C72-9EB7809EC588F2D7>, 2 pages.

Peterson, J. A. et al., (Jul. 21, 1981) "A case study in retrograde evolution: The *onca* lineage in anoline lizards. II. Subdigital fine structure," Bulletin of the Museum of Comparative Zoology, 149(4): 215-268.

Ruibal, Rodolfo et al., (Nov. 1965) "The Structure of the digital Setae of Lizards," Journal of Morphology, 117: 271-294.

Russell, Anthony P. (1975) "Contribution to the functional analysis of the foot of the Tokay, *Gekko gecko* (Reptilla: Gekkonidae)," Zool. Lond., 176: 437-476.

Sitti, Metin et al., (Sep. 2002) "Synthetic Gecko Foot-Hair Micro/Nano-Structures for Future Wall-Climbing Robots," Proceedings of the IEEE International Conference on Robotics and Automation, ICRA 2003, Sep. 14-19, 2003, Taipei, Taiwan, 7 pages.

Stork, N. E. (Oct. 1980) "Experimental analysis of adhesion of *chrysolina polita* (Chrysomelidae: Coleoptera) on a variety of surfaces," J. exp. Biol., 88: 91-107.

Stork, N. E., (Mar. 1980) "A scanning electron microscope study of tarsal adhesive setae in the Coleoptera" Zoological Journal of the Linnean Society, 68: 173-306.

Thurn-Albrecht, T. et al., (Dec. 15, 2000) "Ultrahigh-Density Nanowire Arrays Grown in Self-Assembled Diblock Copolymer Templates," Science, 290: 2126-2129.

Williams, E. E. (Mar. 19, 1982) "Convergent and Alternative Designs in the Digital Adhesive Pads of Scincid Lizards," Science, 215: 509-1511.

* cited by examiner

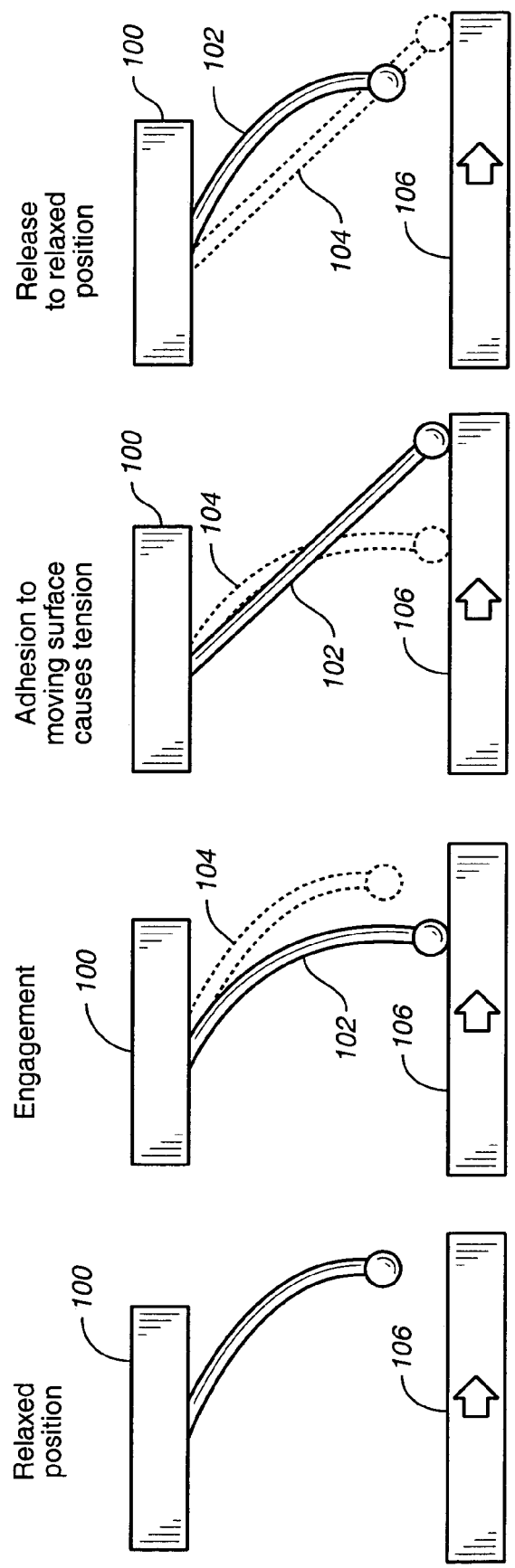

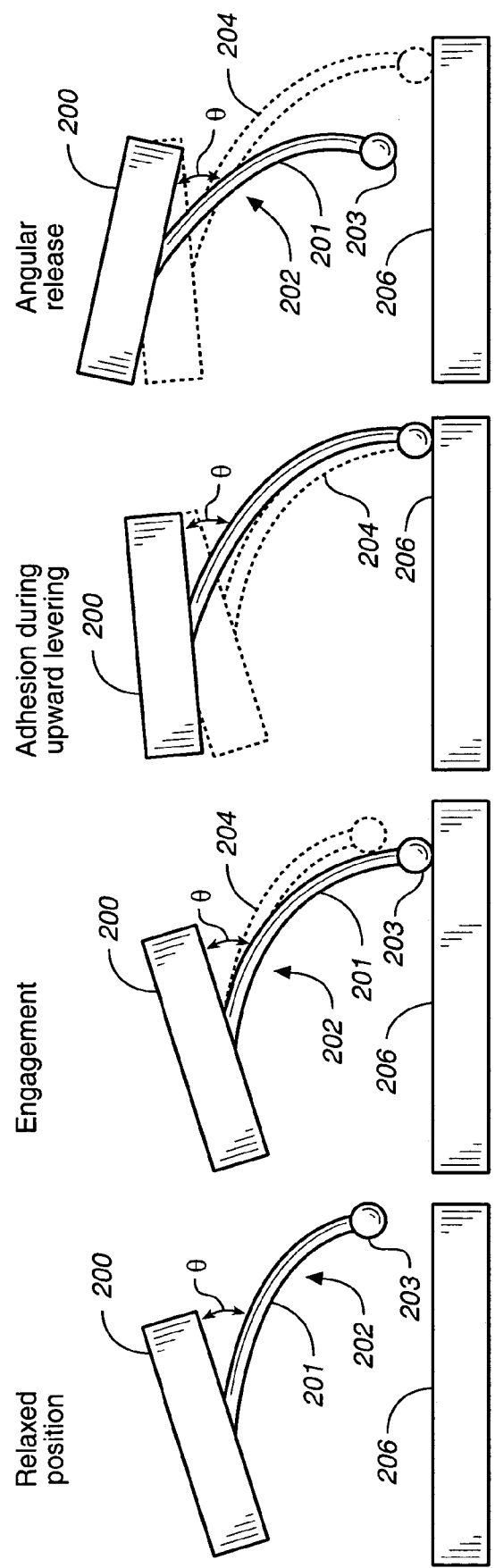

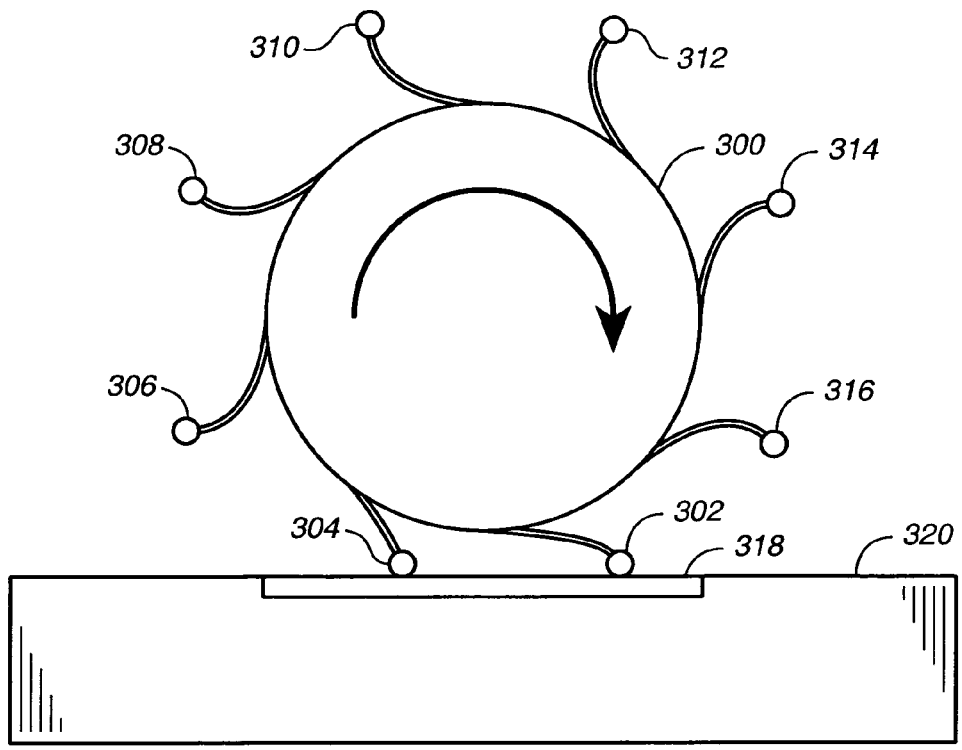
FIG._3
Protective Strip Operation
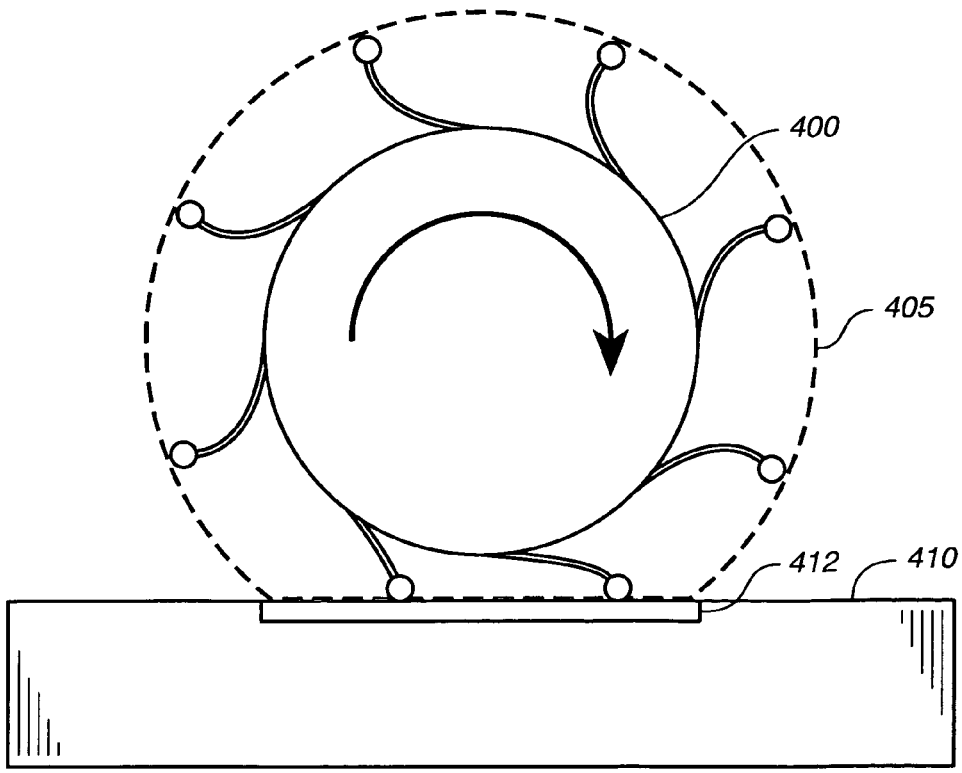
FIG._4A

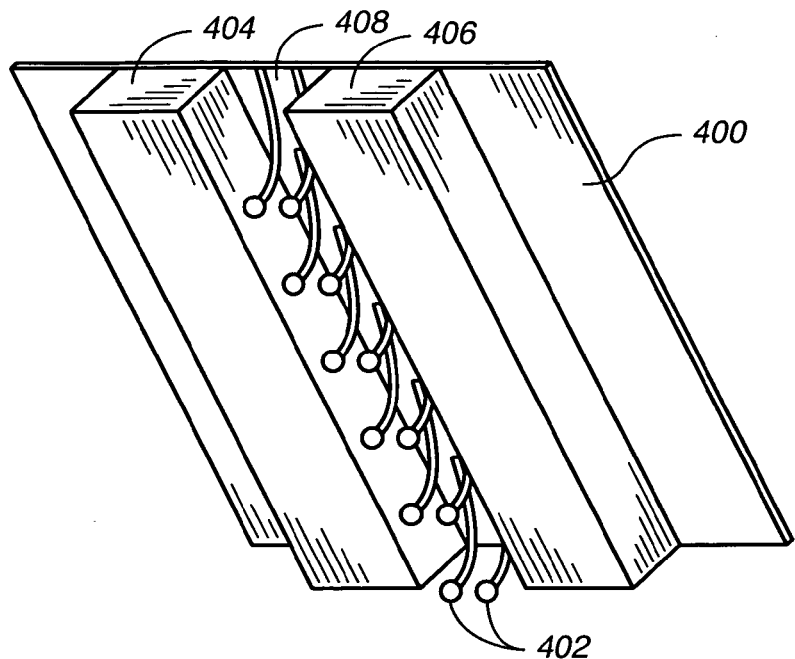
FIG._4B
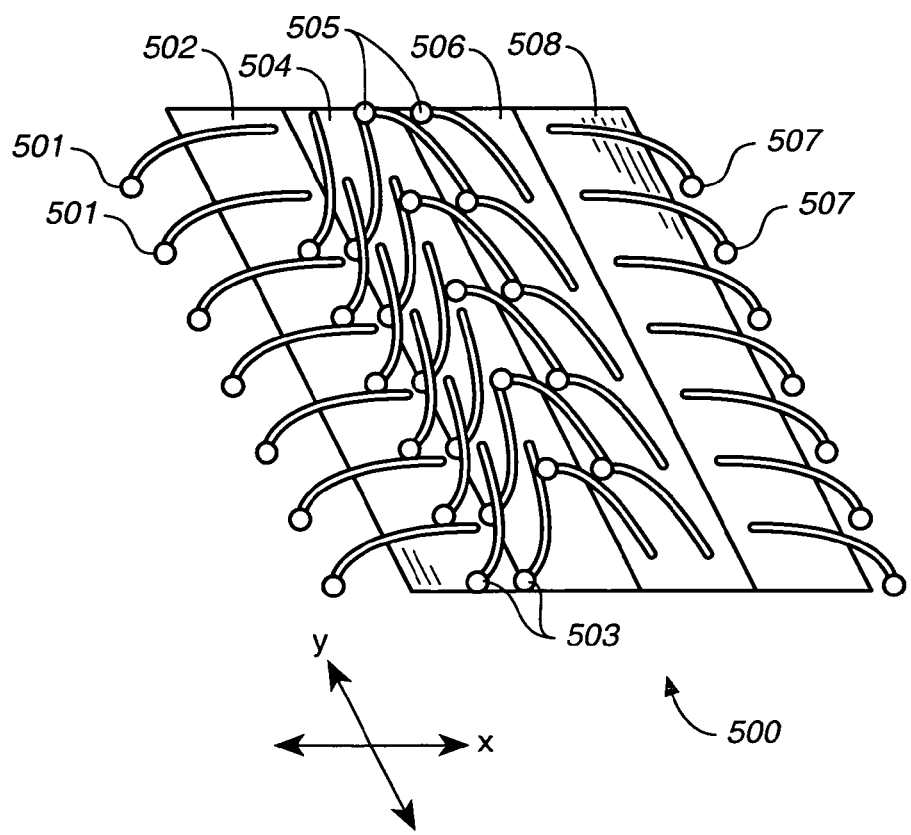
FIG._5

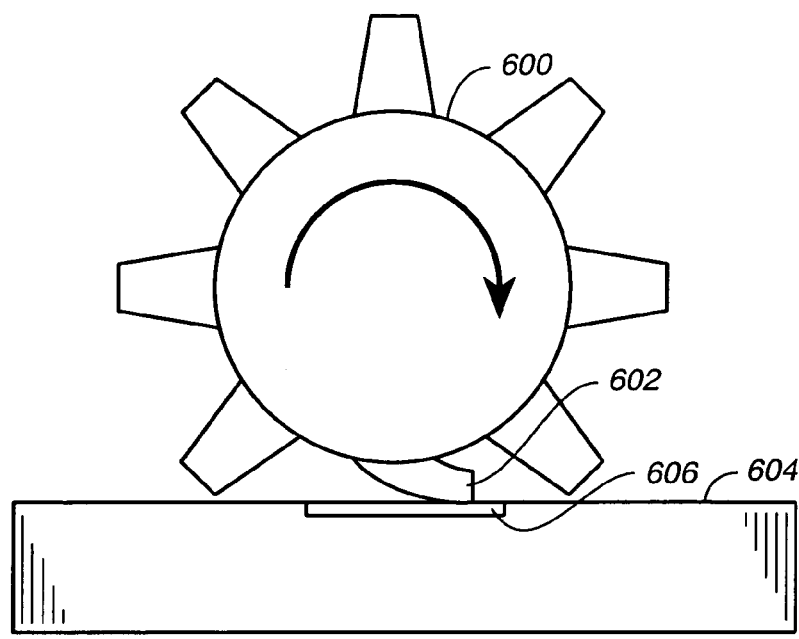
FIG._6A
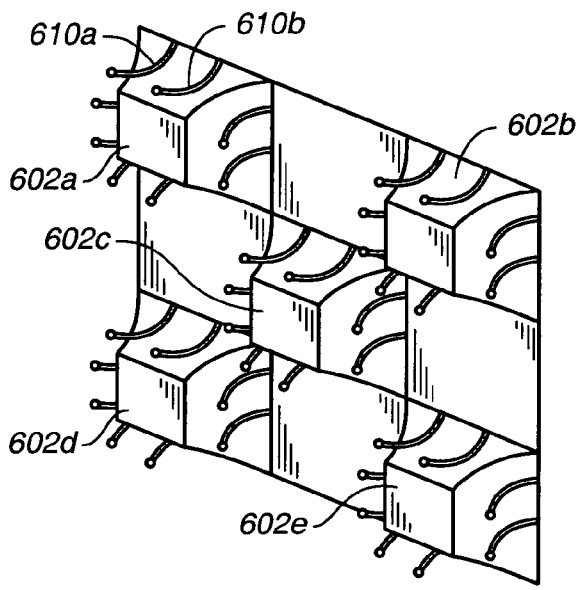
FIG._6B
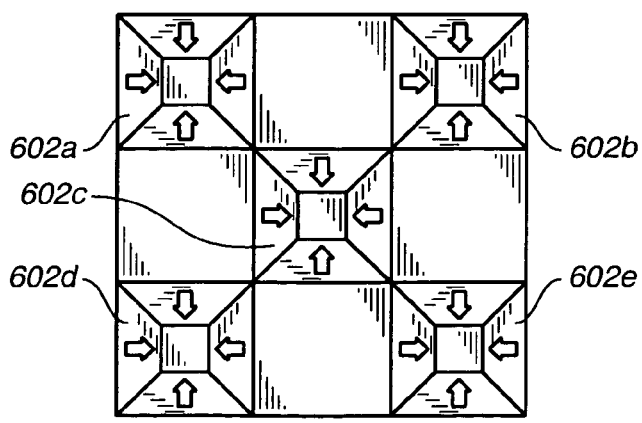
FIG._6C

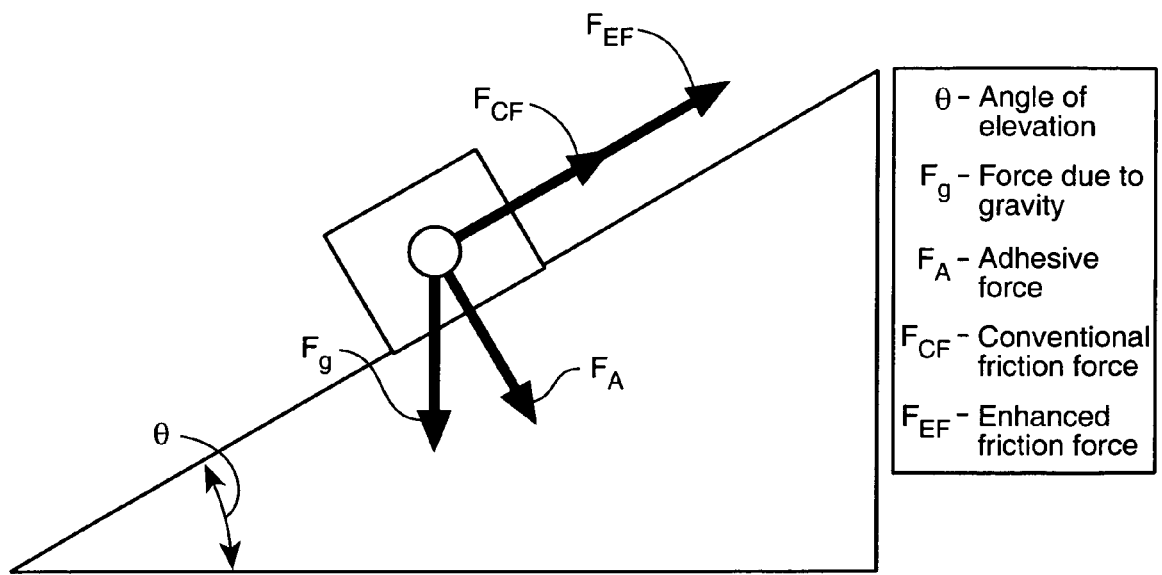
FIG._7
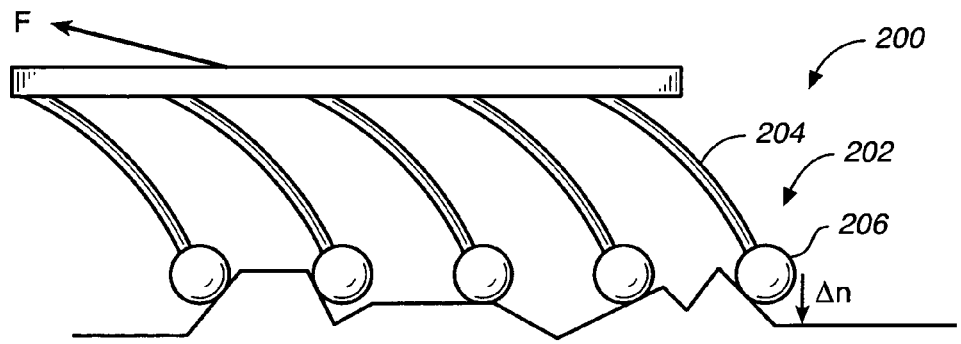
FIG._8
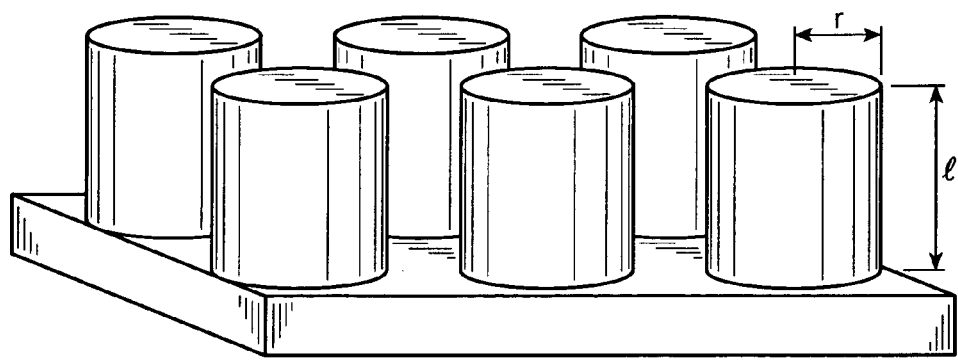
FIG._9

STRUCTURE HAVING NANO-FIBERS ON ANNULAR CURVED SURFACE, METHOD OF MAKING SAME AND METHOD OF USING SAME TO ADHERE TO A SURFACE

RELATED APPLICATIONS

This application claims benefit of U.S. Provisional Application No. 60/508,329, filed Oct. 3, 2003, which is incorporated herein by reference in its entirety.

BACKGROUND

1. Field

This application relates generally to the fabrication and use of micro-and nano-scale adhesive structures. In particular, the application relates to curved surfaces with fabricated adhesive microstructures disposed thereon.

2. Related Art

There is an ongoing need for improved adhesives. Recently, adhesives that mimic structures on the Tokay Gecko have been developed, as disclosed, for example, in U.S. Pat. No. 6,737,160 and U.S. patent application Ser. No. 10/197,763. Adhesives that mimic Gecko adhesion adhere to surfaces by van der Waal's interactions.

Automobile tire manufacture is one field in which improved adhesives can provide enormous benefits. Improved adhesion between tires and road surfaces to a large extent relies on improved materials and material design. Current tires rely on basic rubber compounds and treads to achieve desired wet and dry traction and tire longevity. In conventional tire design, tires designed for adhesion to dry surfaces have different compositions than tires designed for wet surfaces. In many composite materials, and particularly in composite materials that include rubber and polymeric fibers, adhesion between the polymeric fibers and the rubber is a significant factor in the performance. Frequently, tire designers compromise traction in dry conditions with traction in wet conditions. The absence of tire tread is ideal for dry conditions, while a tire with tread provides more traction in wet conditions. Tire designers also compromise materials. "Soft" rubber compounds, for example, provide greater traction than "hard" rubber compounds, at the expense of tire longevity.

Advances in tire manufacture have focused on adjusting tire composition to improve traction between a tire and a contact surface. Such design compromises extend to any curved surface involved in friction-based adhesion. Any friction based wheel, such as those incorporated in printing or copying devices, can benefit from improved adhesion to the paper contact surface. Such design compromises also extend to conventional surfaces, such as rubber shoe soles. The same is true for the design of many curved surfaces that are involved in friction-based contact with contact surfaces.

SUMMARY

In one embodiment, a structure for adhering to a contact surface is provided. The structure includes a curved surface with a plurality of nano-fibers disposed thereon. Each nano-fiber has a diameter between 50 nanometers and 2.0 microns and a length between 0.5 microns and 20 microns, and is capable of providing an adhesive force at the contact surface. In one variation, each of one or more nano-fibers is capable of providing an adhesive force with the contact surface of between 0.06 µN and 0.20 µN. In a further variation, at least one nano-fiber is disposed at an angle between 15 and 75 degrees relative to the wheel surface. In another variation, at least one nano-fiber is disposed at an angle between 30 and 60 degrees relative to the wheel surface.

In another embodiment, when the curved surface is in a first position, at least one of the plurality of nano-fibers contacts the contact surface and provides an adhesive force at the contact surface. When the curved surface rotates to a second position from the first position, the at least one of the plurality of nano-fibers is leveraged way from the contact surface.

BRIEF DESCRIPTION OF THE DRAWINGS

FIG. 1A shows a nano-fiber in a relaxed position prior to engagement with the contact surface;

FIG. 1B shows the nano-fiber of FIG. 1A engaging a contact surface;

FIG. 1C shows the nano-fiber of FIG. 1A adhering to the contact surface;

FIG. 1D shows the release of the nano-fiber of FIG. 1A from the contact surface;

FIG. 2A shows a side view of a nano-fibers mounted on a curved surface moving along a contact surface, according to one embodiment;

FIG. 2B shows a side view of the nano-fiber of FIG. 2A mounted on a curved surface at engagement;

FIG. 2C shows a side view of the nano-fiber of FIG. 2A mounted on a curved surface during upward levering of the nano-fiber;

FIG. 2D shows a side view of the nano-fiber of FIG. 2A at detachment;

FIG. 3 shows a side view of nano-fibers disposed on the curved surface of a wheel, according to another embodiment;

FIG. 4A shows a side view of a tire with nano-fibers disposed protective structures, according to another embodiment;

FIG. 4B shows a perspective view of the nano-fibers disposed in a groove between protective structures according to FIG. 4A;

FIG. 5 shows a perspective representation of nano-fibers disposed in different directions on a curved surface, according to another embodiment;

FIG. 6A shows a side view representation of a plurality of raised sections disposed on the surface of a tire, according to another embodiment;

FIG. 6B shows a perspective view of the embodiment of FIG. 6A, with a plurality of nano-fibers disposed in multiple orientations around the plurality of raised sections;

FIG. 6C shows a top view the embodiment of FIG. 6B;

FIG. 7 shows a side view of the forced on an included object;

FIG. 8 shows a side view of nano-fibers of FIG. 2 disposed on an uneven surface.

FIG. 9 shows a perspective view of an exemplary array of nano-fibers.

DETAILED DESCRIPTION

In order to provide a more thorough understanding of the present application, the following description sets forth numerous specific details, such as specific configurations, parameters, and the like. It should be recognized, however, that such description is not intended as a limitation on the scope of the present disclosure, but is intended to provide a better description of exemplary embodiments.

The present application is directed generally to structures that adhere to contact surfaces. The structures include a curved surface with a plurality of nano-fibers disposed thereon. The nano-fibers mimic nano-fibrous spatulae of Tokay Gecko feet, and adhere to contact surfaces by van der Waal's interactions. The curved surface abuts the contact surface at a contact patch. As a curved surface moves over a contact surface, the nano-fibers disposed on the curved surface create an adhesive force between the curved surface and the contact surface at the contact patch.

The characteristics of nano-fibers may be understood with reference to nano-fibers disposed on flat surfaces. FIGS. 1A–D shows an embodiment of a flat surface 100 with nano-fiber 102 disposed thereon, in various stages of contact with contact surface 106. In the depicted embodiment, contact surface 106 moves left to right. With reference to FIG. 1A, nano-fiber 102 is in relaxed position, not engaged to contact surface 106. With reference to FIG. 1B, nano-fiber 102 has engaged contact surface 106 from its previous position 104. With reference to FIG. 1C, the nano-fiber is pulled along contact surface 106 from right to left from its previous position 104, resulting in tension in the nano-fiber. With reference to FIG. 1D, the nano-fiber is released from contact surface 106, and is again in the relaxed position. This movement of nano-fibers mimics "walking" of Gecko hairs across a contact surface. When dragged across contact surface 106, flat surface 100 is thus in a constant state of dynamic friction with contact surface 106.

Adhesion of nano-fibers at a contact surface also occurs when the nano-fibers are disposed on a curved surface. With reference to FIGS. 2A–D, plane 200 represents a surface tangent to a curved surface at various stages of forward (i.e. left to right) rotation. With reference to FIG. 2A, in the relaxed position, nano-fiber 202 disposed on curved surface 200 does not yet engage contact surface 206. With reference to FIG. 2B, as curved surface 200 rolls onto contact surface 206, nano-fiber 202 engages contact surface 206 from its previous position 204. With reference to FIG. 2C, curved surface 200 continues to roll forward and nano-fiber 202 continues to adhere to contact surface 206, although its angle relative to contact surface 206 has changed. With reference to FIG. 2D, as curved surface 200 continues to turn in the clockwise direction nano-fiber 202 rotates around contact surface 206 levering the contact point of the nano-fiber past the release angle of the nano-fiber. Nano-fiber 202 disengages from contact surface 206 from its previous position 204.

Each nano-fiber in FIG. 2, when in contact with contact surface 206, mimics the adhesive properties of nano-fibrous spatulae situated on setae of a Tokay Gecko. In certain embodiments, the average force provided at the contact surface by a single nano-fiber is between about 0.06 to 0.20 µN, or between about 60 and 200 nano-Newtons. In other embodiments, the average force provided at the contact surface by a single nano-fiber is between about 1.00 and 200 nano-Newtons. In other embodiments, the nano-fiber can provide a substantially normal adhesive force of between about 20 and 8,000 nano-Newtons. In still other embodiments, the nano-fiber can provide a substantially parallel adhesive force of between about 5 and 2,000 nano-Newtons. The sheer force is the product of the normal force and the coefficient of friction.

An array of nano-fibers may be disposed on the surface of curved surface 200. In cases where only 10% of a 1000 nano-fiber array adheres to the contact surface with 2 µN adhesive force each, the array adheres to the contact surface with 200 µN adhesive force. Providing millions of such nano-fibers at the contact surface provides significantly greater adhesion.

In certain embodiments, the surface of wheel 200 is a compliant or flexible substrate. The substrate can be any compliant or flexible material known in the art. Examples of such substrate materials include polymers, such as polyester, polyurethane and polyimide.

With further reference to FIG. 2A, nano-fiber 202 includes stalk 201 and terminus 203. In general, stalk 201 may be between about 0.5 microns and 20 microns in length. The diameter of the stalk is between about 50 nanometers (nm) and 2.0 microns. In the present embodiment, the nano-fiber terminus 203 is a curved segment of a sphere. Adhesion is produced as the nano-fiber terminus abuts contact surface 206. It will be recognized that the terminus can have any shape. In other exemplary embodiments, the terminus may be in the form of a paddle or flattened surface, a flattened segment of a sphere, an end of a cylinder, a sphere, or a rounded or flat end with essentially the same shape as stalk 201. For example, FIG. 9 depicts an array of nano-fibers, each having a defined radius and length, that terminate in a blunt end.

With further reference to the embodiment of FIG. 2, each nano-fiber is supported at an oblique angle θ (neither perpendicular nor parallel) relative to curved surface 200. This angle may be between about 15 and 75 degrees, and more preferably between about 30 degrees and 60 degrees. This angle, in one embodiment, is 30 degrees. Stalk portion 201 is depicted as curved along its length. As is readily apparent to those skilled in the art, in other embodiments the stalk portions of the nano-fibers can be either straight or curved.

By proper choice of nano-fiber length, angle, density and diameter, and substrate material, nano-fibers or arrays of nano-fibers can adhere to very rough surfaces. To avoid nano-fiber tangling, nano-fibers are optimally sufficiently stiff and separated while still dense sufficient to provide enough adhesion force. Arrays of nano-fibers can be constructed to prevent adhesion to each other. A further discussion of all such design characteristics of nano-fibers that are configured to mimic gecko seta is found in U.S. Pat. No. 6,737,160 and U.S. patent application Ser. No. 10/197,763, each of which is hereby incorporated by reference in its entirety.

When nano-fibers are disposed on a curved surface, the force of adhesion between nano-fibers and a contact surface is in addition to frictional force between the curved surface and contact surface. One example of a curved surface is a wheel, such as an automobile tire. The forces on a wheel that includes a plurality of nano-fibers are illustrated with reference to FIG. 7. Assuming the wheel has a coefficient of static friction of approximately 1, when 1 unit of force is applied normal to wheel, 1 unit of force is available for traction, which can be expressed in the following equation:

$$F_{CF} = \mu F_N, \qquad \text{(Equation 2.1)}$$

where $F_{CF}$ is the available conventional friction force, µ is the coefficient of static friction, and $F_N$ is the applied normal force. Available traction (friction force) depends almost entirely on the vertical load (normal force) applied on conventional wheel. Nano-fibers on the wheel provide an adhesive force in addition to the normal force, thus increasing the available friction force. This enhanced friction force can be described as:

$$F_{EF} = \mu(F_N + F_A) \qquad \text{(Equation 2.2)}$$

Here, μ and $F_N$ are as described in Equation 2.1 above, while $F_A$ is the added adhesive force and $F_{EF}$ is the enhanced friction force. More generally, with $F_N$ expressed as a function of gravity and angle of elevation:

$$F_{EF}=\mu(F_g\cos(\theta)+F_A) \quad \text{(Equation 2.3)}$$

Where $F_{EF}$, and μ are as described in Equation 2.1, $F_g$ is the force due to gravity acting on the tire, and θ is the angle of elevation. Thus, because nano-fibers are in fact providing adhesion, traction is available with a nano-fiber wheel even when present loads are zero, or to a point, negative. Adhesion of the nano-fibers enhances the frictional force of the wheel.

Adhesion and detachment of a nano-fiber configured on the curved surface of a wheel are further represented in the embodiment depicted in FIG. 3. Wheel 300 includes nano-fibers 302, 304, 306, 308, 310, 312, 314, and 316, and is in contact with contact surface 320 at contact patch 318. Nano-fibers 306, 308, 310, 312, 314, and 316 disposed on wheel 300 are not in contact with contact patch 318. As wheel 300 rotates, nano-fiber 302 engages contact surface 320. Adhesive force of the nano-fiber, $F_a$, as well as the normal load applied to the nano-fiber by weight of the wheel and any device attached there to, $F_n$, engages the fiber with the contact surface 320 at contact patch 318. Nano-fibers 302 and 304 adhere to contact surface 320. Nano-fiber tension is due to adhesion at the nano-fiber-road interface acting against the rotational moment of wheel 300, while nano-fiber compression is due to the weight of the wheel and any components attached thereto against the contact surface. After further rotation, the angle created between the base of nano-fiber and tip increases and eventually surpasses the fiber's release angle, as discussed further herein. At the detachment angle, very little force is required to cause the nano-fiber to detach from the contact surface. Nano-fibers 306, 308, 310, 312, 314, and 316 are not in contact with the contact surface. The process of engagement and detachment repeats as the wheel continues to rotate over the contact surface.

Nano-fibers achieve optimal adhesion when "pre-loaded" onto the wheel. As used herein, "pre-load" refers to providing a force on a nano-fiber normal to the contact surface, followed by a force parallel to the contact surface. With further reference to FIG. 3, nano-fiber 302 first contacts contact patch 318, the nano-fiber is pushed into the contact patch surface. The terminus of nano-fiber 302 is directed into the contact surface. As the wheel continues to rotate, contact patch 302 is pulled linearly on the surface of the nano-fiber. The natural rotation of the wheel thus provides for pre-loading as a consequence of wheel rotation. A small perpendicular preloading force in concert with a rearward displacement or-parallel preload is optimal in "engaging" adhesion. In addition, "preloading" is believed to increase the number of nano-fibers contacting the surface. The same pre-loading process occurs for other nano-fibers disposed on wheel 300. As will be recognized by those skilled in the art, pre-loading can be accomplished for nano-fibers disposed on any curved surface.

Nano-fibers disposed on a wheel can detached from the contact surface by levering, or "peeling," the nano-fiber away from the contact surface. The nano-fibers thus do not need to overcome the adhesive force between the nano-fiber and contact surface the surface to be removed from the surface. With further reference to FIG. 3, nano-fibers 302 and 304 are supported at an oblique angle (neither perpendicular nor parallel) relative to contact surface 320. As wheel 300 rotates and nano-fiber 304 moves upward and away from contact surface 320, the angle of nano-fiber 304 with respect to contact patch 318 increases. When nano-fiber 304 reaches a detachment angle, it detaches from contact patch 318 without having to overcome the force of adhesion to contact patch 318. The rotation of the wheel thus allows nano-fibers to peel away form the contact surface. The same process of detachment occurs for other nano-fibers disposed on wheel 300.

Nano-fibers are also designed to be compatible with rough surfaces, not only smooth surfaces. An exemplary plurality of nano-fibers contacting a rough surface are depicted in FIG. 8. During preload, each nano-fiber may contact the surface at different heights, with a height variation Δn. The stiffness of each nano-fiber should be set such that the pull-off force $F_n=k_n\Delta n$ of a nano-fiber is less than the adhesion force $F_o$, otherwise nano-fibers will pull off when the nano-fibers are loaded. When contact is first made, there may be local sliding in the patch, which could also cause height variations Δn with rough surfaces.

When nano-fibers under a weight load impact a contact surface, they can break or sheer off the curved surface, effectively preventing further adhesion. To prevent nano-fibers from sheering off a curved surface, the curved surface can be configured in such a way that the base of the nano-fiber is protected from the contact surface. FIGS. 4A and 4B disclose one such embodiment. With reference to FIG. 4B, the surface of wheel 400 includes two raised sections 404 and 406. A plurality of nano-fibers 402 are disposed on wheel 400 in groove 408 formed between raised sections 404, 406. With reference to FIG. 4A, as wheel 400 rotates in the clockwise direction, raised sections 404, 406 (FIG. 4B) form outer wheel diameter 405. Nano-fibers 402 adhere to contact surface 410 at contact patch 412. As wheel 400 turns, the release angle of nano-fibers increases, and the nano-fibers are released from contact surface 410. With reference to FIG. 4B, because the nano-fibers are disposed in groove 406 between protective strips 404, 406, they do not impact contact surface 410 (FIG. 4A). The terminus of each nano-fiber adheres to the contact surface, without damaging or sheering off the nano-fiber.

Adhesion of each nano-fiber depends on the direction in which the nano-fiber is disposed on the curved surface. Nano-fibers are generally capable of adhering to a contact surface when they are moved in the direction of the contact surface. The nano-fibers in the embodiment depicted in FIG. 4B have a single orientation with respect to the curved surface. The nano-fibers aligned in a single orientation provide frictional adhesion as the wheel rotates in a single direction. Adhesion in the direction of the nano-fibers is maximized.

Nano-fibers can be oriented on the curved surface in different directions. FIG. 5 shows an embodiment in which nano-fibers are configured on a curved surface in a number of different directions to-provide adhesion during acceleration in different directions. Surface 500 shows a plurality of nano-fibers arranged on areas 502, 504, 506, and 508, respectively. Nano-fibers 501 disposed on surface 500 in area 502 are oriented in the (−x) direction. Nano-fibers 501 thus provide adhesion when surface 500 rotates in the (−x) direction. Nano-fibers 503 disposed on surface 500 in area 504 are oriented in the (−y) direction. Nano-fibers 503 provide adhesion when surface 500 rotates in the (−y) direction. Likewise, nano-fibers 505 disposed on surface 500 in area 506 are oriented in the (+y) direction. Nano-fibers 505 thus provide adhesion when surface 500 rotates in the (+y) direction. Lastly, nano-fibers 507 disposed on surface 500 in area 508 are oriented in the (+x) direction. Nano-fibers 507 thus provide adhesion when surface 500 rotates in the (+x) direction.

The embodiment of FIG. 5 provides adhesion regardless of the direction of wheel rotation. Nano-fibers 503 in area 504, for example, provide traction for acceleration in the (−y) direction, but do not provide traction for deceleration in the (+y) direction. Similarly, nano-fibers 505 in area 506 may provide traction for acceleration in the (−x) direction, but do not provide traction for deceleration in the (+x) direction.

In other embodiments, nano-fiber and wheel geometry may be designed to provide exposure of nano-fibers only when moving in a single direction. With referenced to FIG. 6A, Wheel 600 is configured with a plurality of raised sections 602. As wheel 600 moves clockwise, each raised section 602 is in contact with contact surface 604 at contact patch 606. With reference to FIG. 6B, raised sections 602a–e disposed on the bottom of the wheel surface are arranged in three rows. A plurality of nano-fibers are disposed around each raised section 602a–e. The nano-fibers are configured such that they can provide directional adhesion in the direction of wheel rotation when they come in contact with the contact patch of the contact surface. Nano-fibers 610a and 610b, for example, are configured to adhere to contact surface 602 when raised section 602a rolls in their direction on the contact surface. With reference to FIG. 6C, arrows on each side of each raised section 602a–e show that the nano-fibers disposed thereon provide adhesion when the surface is rotated.

With reference to FIG. 6A, as wheel 600 rotates, each raised section comes in contact with contact patch 606 of contact surface 604. Specifically, FIG. 6A depicts raised section 602 in contact with contact patch 606. Each nano-fiber is configured to adhere to a surface when wheel 600 rotates in the direction of the surface of the raised section on which the nano-fiber configured. Nano-fibers on the contact side of raised section 602 are aligned to provide adhesion to contact patch 606. These nano-fibers provide adhesion in the direction of surface rotation. Other nano-fibers on sides of the raised section that are not in contact with contact patch 606 do not provide adhesion. Moreover, nano-fibers that are not configured to provide adhesion are not damaged or sheered during wheel rotation.

As will be appreciated by those of skill in the art, nano-fibers disposed on curved surfaces may be oriented in any direction relative to the curvature of the surface. In one embodiment, the nano-fibers maybe disposed on the surface in a single direction. In other embodiments, nano-fibers in different locations on the curved surface may be disposed in different directions. In still other embodiments, nano-fibers may be dispersed over the curved surface in different orientations at random. Such random orientations are versatile for traction on contact surfaces.

In other embodiments, the one or more nano-fiber may be may be disposed on a shaft, as described, for example, in U.S. patent application Ser. No. 10/197,763. A supporting shaft, which can form a supporting surface as discussed in more detail below, may be between about 1 and 500 microns long, preferably approximately 10 to 150 microns long. The diameter of the shaft is between about 1 and 10 microns. In one exemplary embodiment, the stalk includes 100 nano-fibers. In certain embodiments, supporting shafts may be between 1 and 500 microns long, preferably approximately between 10 and 150 microns long. In other embodiments, the diameter of such supporting shafts may be between about 1 and 10 microns.

In another embodiment, nano-fibers may be built one upon the other to form a hierarchical nano-fiber geometry. Hierarchical nano-fibers may have a tree structure, where a large diameter base of perhaps six micron diameter branches into two or more nano-fibers of perhaps three micron diameter, which in turn each branch into two or more nano-fibers of lesser diameter, thereby enhancing nano-fiber-to-contact surface compliance without a loss in effective nano-fiber stiffness. In this way, a material of higher stiffness, such as a high performance polymer or steel, can achieve an effective stiffness much less than that seen in an array of simple single diameter nano-fiber shafts, and thus heightened nano-fiber engagement, due to effectively more compliant nano-fibers.

Nano-fibers can be designed from any material known in the art. Nano-fibers can have a number of different characteristics based on their size, shape, and composition. These characteristics result in differences in adhesion characteristics with contact surfaces. Nano-fibers have specific lengths and radii. Arrays of nano-fibers can be arranges with a specific density of nano-fibers. The materials used in nano-fibers have a specific Young's modulus. The ability of a nano-fiber disposed on a curved surface to interact with a contact surface depends in part on the contact patch area and the weight supported by the curved surface and projected onto the contact surface. The nano-fiber engagement force can be calculated as described above.

When a plurality of nano-fibers is disposed on a tire surface, the tire surface does not abrade as readily by friction between the tire and a contact surface. Instead the peak stress of a skid is spread over the nano-fibers. As a result, wheels in general and tires in particular can have a longer life.

The properties of nano-fibers disposed on a wheel surface can be used to calculate a number of different properties of the nano-fibers, as summarized in Table 1. Nano-fiber bending stiffness is a function of nano-fiber length and the Young's Modulus of the nano-fiber material. The number of nano-fibers that can be engaged at the contact surface is a function of the area of the applied force and the nano-fiber density. The engaged force thus depends on the number of nano-fibers engaged and the nano-fiber engagement force. Nano-fiber normal load depends on the weight supported by the wheel, nano-fiber displacement depends on the nano-fiber normal load force and the nano-fiber bending stiffness, and the nano-fiber displacement depends on the acceleration force of the wheel and the number of nano-fibers engaged. An equivalent conventional coefficient of static friction for a wheel containing a plurality of nano-fibers can be calculated from the enhanced frictional force of the wheel and the applied normal force, both of which are as discussed above. An exemplary array of nano-fibers, with their length and radius defined, are depicted in FIG. 9.

TABLE 1

Cantilever and Friction Enhancement Model Equation Summary

| | | |
|---|---|---|
| Nano-fiber bending stiffness: | $K_y = (3\pi r^4 E)/(4l^3)$ | (Equation 5.1) |
| Number of Nano-fibers engaged: | $N = A_c D$ | (Equation 5.2) |
| Engaged force: | $F_A = NF_a$ | (Equation 5.3) |
| Nano-fiber normal load: | $F_n = W/N$ | (Equation 5.4) |
| Nano-fiber displacement: | $\Delta y = F_n/k_y$ | (Equation 5.5) |
| Nano-fiber tension: | $F_t = F_{HP}/N$ | (Equation 5.6) |
| Friction force: | $F_{EF} = \mu(F_N + F_A)$ | (Equation 2.2) |
| Equivalent conventional coefficient of Static Friction (CSF) | $\mu_{EQ} = F_{EF}/F_N$ | (Equation 5.7) |

In one embodiment, nano-fibers disposed on a tire are constructed from high performance polymer. Table 2 depicts the characteristics of the nano-fibers, and the calculated friction enhancement parameters of the array of nano-fibers when disposed on a wheel surface. The high performance polymer has a high coefficient of static friction and high material stiffness. The model assumes that only 10% of nano-fibers engage the contact patch.

the contact patch. Steel nano-fibers have nearly twenty times the stiffness of the high performing polymer, allowing nano-fiber geometries to be tuned such that four times as many fibers engage in the contact region with steel than with high performance polymer. Steel gained a 5 fold increase in coefficient of static friction, while high performance poly-

TABLE 2

Calculated Adhesion Parameters of Alumina Nanopore Cast High Performance Polymer Nano-fibers

| | | | | | |
|---|---|---|---|---|---|
| Nano-fiber radius: | r | 1.00E−07 m | Nano-fiber bending stiffness: | $k_y$ | 2.89E−03 N/m |
| Nano-fiber length: | l | 1.00E−05 m | Number of nano-fibers engaged: | N | 1.02E+12 |
| Nano-fiber density | D | 1.41E+13 m-2 | Engaged force: | $F_A$ | 1.02E+04 N |
| Young's Modulus: | E | 1.23E+10 Pa | Nano-fiber normal load | $F_n$ | 9.62E−09 N |
| Coefficient of static friction: | μ | 2.00 | Nano-fiber displacement: | $D_y$ | 3.33E−06 m |
| Nano-fiber engagement force: | $F_a$ | 1.00E−08 N | Nano-fiber tension: | $F_t$ | 6.11E−10 N |
| Vehicle weight: | W | 9.80E+03 N | Enhanced friction force: | $F_{EF}$ | 4.00E+04 N |
| Contact patch area: | $A_c$ | 7.20E−02 m2 | Equivalent conventional CSF | $\mu_{EQ}$ | 4.08 |
| Acceleration force: | $F_{HP}$ | 6.23E+02 N | CSF enhancement factor | | 2.04 |

The wheel configured with the nano-fibers has a higher equivalent conventional coefficient of static friction than an embodiment without the nano-fibers.

In another embodiment, nano-fibers disposed on a wheel are constructed from alumina nanopore cast steel. Table 3 depicts the characteristics of the nano-fibers, and the calculated friction enhancement parameters of the array of nano-fibers when disposed on a wheel surface. The steel nano-fibers have a low coefficient of static friction.

mer only gained a 2 fold increase. Available traction is still greater with the high performance polymer due to the high conventional coefficient of static friction. However, tires with steel nano-fiber disposed thereon can have superior wear and lifetime properties, and the van der waals forces between conductive materials can be higher than between insulated polymers.

In some embodiments, the wheel can be an automobile tire. Tires with nano-fibers as described herein that are

TABLE 3

Calculated Adhesion Parameters of Alumina Nanopore Cast High Performance Polymer Nano-fibers

| | | | | | |
|---|---|---|---|---|---|
| Nano-fiber radius: | r | 5.00E−08 m | Nano-fiber bending stiffness: | $k_y$ | 2.95E−03 N/m |
| Nano-fiber length: | l | 1.00E−05 m | Number of nano-fibers engaged: | N | 4.07E+12 |
| Nano-fiber density | D | 5.66E+13 m-2 | Engaged force: | $F_A$ | 4.07E+04 N |
| Young's Modulus: | E | 2.00E+11 Pa | Nano-fiber normal load: | $F_n$ | 2.41E−09 N |
| Coefficient of static friction: | μ | 0.34 | Nano-fiber displacement: | $D_y$ | 8.17E−07 m |
| Nano-fiber engagement force: | $F_a$ | 1.00E−08 N | Nano-fiber tension: | $F_t$ | 1.53E−10 N |
| Vehicle weight: | W | 9.80E+03 N | Enhanced friction force: | $F_{EF}$ | 1.72E+04 N |
| Contact patch area: | $A_c$ | 7.20E−02 m2 | Equivalent conventional CSF | $\mu_{EQ}$ | 1.75 |
| Acceleration force: | $F_{HP}$ | 6.23E+02 N | CSF enhancement factor | | 5.16 |

In the embodiments summarized in Tables 2 and 3, the wheel configured with the nano-fibers has a higher equivalent conventional co-efficient of static friction than an embodiment without the nano-fibers. Thus, wheels constructed from materials having low and high conventional coefficients of static friction have increased coefficient of static friction when configured with nano-fibers. Both materials have increased frictional force $F_{EF}$, coefficient of static friction (CSF), and CSF enhancement factor. Based on the calculated properties of the wheels, nano-fibers with higher material stiffness provided for greater adhesion, as stiffer materials allow for increased nano-fiber densities, and thus a potential for increased nano-fiber engagement numbers in constructed out of materials with both low and high conventional coefficients of static friction on concrete allow increased tire adhesion. Nano-fibers constructed of stiffer materials allow for increased nano-fiber densities over an area of tire. Increased nano-fiber density results in increased nano-fiber engagement. For example, the steel nano-fiber has nearly twenty times the stiffness of the high performance polymer. As such, the stiffness allows four times as many steel nano-fiber to engage in the contact region than high performance. As described above, the steel nano-fiber gained a 5 fold increase in coefficient of static friction, as compared to the high performance polymer that gained a 2 fold increase in static friction. The available traction of the steel nano-fiber exceeds that of the high performance polymer due to steel's high conventional coefficient of static friction.

Automobiles equipped with tires having nano-fibers as described herein have a safety margin for rollover and loss of contact with uneven contact surfaces. Because the adhesive mechanism of nano-fibers depends on fiber geometry, adhesion of nano-fibers is mostly independent of nano-fiber material. In this way, there is lesser compromise to be made on rubber compound hardness, because a hard material can demonstrate van der Waals bonding to an equal extent that a soft material can demonstrate van der Waals bonding. Indeed, rubber need not be the material used, as even metals can display van der Waals bonds. With available friction greater in a nano-fiber covered tire than on a conventional tire, less importance can be placed on contact area, and more tread pattern for wet traction can be utilized when tires onto which nano-fibers are compared to conventional tires on an equal traction-for-traction basis. The function of contemporary rubber tires depends on the tire temperature. During a race, for instance, tires must be "warmed up" for a period of time after changing tires and before optimal friction is available. Street tires have this temperature dependence as well. The well-known superhydrophobic nature of nano-structured fiber surfaces also improves wet surface performance.

The materials used in conventional tires provide optimal adhesion only at high temperatures. Conventional tires are designed to account for heat generated during rotation. Conventional tires are designed to provide optimal traction only at high temperatures. Tires configured with adhering nano-fibers, however, reduce the negative effects of temperature on traction.

In addition, conventional tires damage road surfaces. In particular, conventional tires "snap back" at the edge of the contact patch, resulting in wear on the road surface. In contrast, tires configured with the nano-fibers as described herein provide less wear on the road from dynamic friction than conventional tires. Instead, nano-fibers on tires disengage from the road surface by angular detachment.

The ability of nano-fibers to walk along a surface without sliding also prevents nano-fibers from being torn or abraded in a skid. Nano-fibers never reach a state of dynamic friction. In addition, peak stress on individual nano-fibers is significantly less than the nano-fiber yield stress, so wear is greatly reduced. For example, a tire covered with nano-fibers degrades at a rate well below that of a conventional automobile tire when the tire does not rotate, but rather slides, along the contact surface (i.e. in a "skid"). Wheel lock may be even desirable, because the faster wheel moves, the greater the stopping force the nano-fibers on the tires will provide.

The curved surface may be any curved surface known in the art. In one embodiment, the curved surface may part of a shoe sole. In other embodiments, the curved surface can also be any kind of wheel involved in dynamic friction with a surface. Non-limiting examples of such wheels include wheels used in a paper feeding apparatus, bicycle tires, and automobile tires. The engaging, contact, and release areas of a tire contact patch are also seen on belt-like treads, such as those on the tread of a tank.

The wheels may also provide adhesion to otherwise slippery surfaces. In one exemplary embodiment, the curved surface configured with nano-fibers can adhere to ice. In other embodiments curved surfaces configured with nano-fibers can adhere to any other slippery surface known in the art, including highly polished surfaces.

Although the present application has been described with respect to certain embodiments, configurations, examples, and applications, it will be apparent to those skilled in the art that various modifications and changes may be made without departing from the application.

We claim:

1. A structure for adhering to a contact surface comprising:
    an annular curved surface rotatable about an axis of rotation; and
    a plurality of nano-fibers disposed on the curved surface, each nano-fiber having a diameter between 50 nanometers and 2.0 microns and a length between 0.5 microns and 20 microns,
    wherein the curved surface is configured to rotate from a first position to at least a second position,
    wherein when the curved surface is in the first position, at least a first nano-fiber of the plurality of nano-fibers contacts the contact surface and provides an adhesive force at the contact surface, and at least a second nano-fiber of the plurality of nano-fibers is unattached to the contact surface; and
    wherein when the curved surface rotates to the second position from the first position, at least the first nano-fiber is leveraged away from the contact surface, and at least the second nano-fiber contacts the contact surface and provides an adhesive force at the contact surface, and
    wherein the first and second nano-fibers are oriented at an oblique angle other than 0 degrees and 90 degrees with respect to the annular curved surface when unattached to the contact surface and extend in the circumferential direction of the annular curved surface.

2. The structure of claim 1, wherein the first and the second nano-fibers are each capable of providing an adhesive force with the contact surface of between 0.06 µN and 0.20 µN.

3. The structure of claim 1, wherein the first and the second nano-fibers are each at an angle between 15 and 75 degrees relative to the curved surface when unattached to the contact surface.

4. The structure of claim 3, wherein the first and the second nano-fibers are each at an angle between 30 and 60 degrees relative to the curved surface when unattached to the contact surface.

5. The structure of claim 1, wherein the first nano-fiber adheres to the contact surface at the front portion of a contact patch, and the second nano-fiber adheres to the rear portion of the contact patch.

6. The structure of claim 1, wherein the annular curved surface is at least a portion of a wheel.

7. The structure of claim 1, wherein the plurality of nano-fibers extend from the annular curved surface in a single direction relative to the annular curved surface.

8. The structure of claim 1, wherein a first group of said nano-fibers at a first region of the annular curved surface extends from the annular curved surface in a first direction relative to he annular curved surface, and a second group of said nano-fibers disposed on a second region of the annular curved surface extends from the annular curved surface in a second direction relative to the annular curved surface.

9. The structure of claim 1, wherein the annular curved surface includes one or more raised sections, and at least one said nano-fiber has a base and is disposed on the curved surface outside the raised sections such that the base of the at least one nano-fiber does not contact the contact surface during rotation.

10. The structure of claim 9, wherein two said raised sections form a groove therebetween, and the at least one nano-fiber is disposed on the annular curved surface in the groove.

11. The structure of claim 1, wherein the first and the second nano-fibers are each capable of providing an adhesive force with the contact surface of between 0.01 µN and 0.20 µN.

12. A tire comprising:
a curved tire surface; and
a plurality of nano-fibers disposed on the curved tire surface, each nano-fiber having a diameter between 50 nanometers and 2.0 microns and a length between 0.5 microns and 20 microns, and each nano-fiber capable of providing an adhesive force at a contact surface, and wherein the plurality of nano-fibers comprise at least a first nano-fiber and at least a second nano-fiber, and wherein each of the first and second nano-fibers are oriented at an oblique angle other than 0 degrees and 90 degrees with respect to the curved surface of the tire and extend in the circumferential direction of the tire, and wherein when the tire is in a first position, at least the first nano-fiber contacts the contact surface and provides an adhesive force at the contact surface and at least the second nano-fiber is unattached to the contact surface, and when the tire rotates to a second position from the first position, at least the first nano-fiber is leveraged away from the contact surface and at least the second nano-fiber contacts the surface and provides an adhesive force at the contact surface.

13. The tire of claim 12, wherein the first and the second nano-fibers are each capable of providing an adhesive force with the contact surface of between 0.06 µN and 0.20 µN.

14. The tire of claim 12, wherein the first and the second nano-fibers are each at an angle between 15 and 75 degrees relative to the tire surface.

15. The tire of claim 14, wherein the first and the second nano-fibers are each at an angle between 30 and 60 degrees relative to the tire surface.

16. The tire of claim 12, wherein the first nano-fiber adheres to the contact surface at the front portion of a contact patch, and the second nano-fiber adheres to the rear portion of the contact patch.

17. The tire of claim 12, wherein the tire includes two raised sections, wherein the plurality of nano-fibers is disposed between the two raised sections.

18. The tire of claim 12, wherein the tire includes at least one raised section, and wherein the plurality of nano-fibers is disposed around the base of the raised section.

19. The tire of claim 12, wherein the plurality of nano-fibers extend from the curved surface of the wheel in a single direction relative to the curved surface.

20. The tire of claim 12, wherein a first group of said nano-fibers at a first region of the curved surface extends from the curved surface in a first direction relative to the curved surface, and a second group of said nano-fibers disposed on a second region of the curved surface extends from the curved surface in a second direction relative to the curved surface.

21. The tire of claim 12, wherein the frictional properties of the tire are enhanced by intermolecular forces at each nano-fiber.

22. The tire of claim 21, wherein intermolecular forces are van der Waal's interactions.

23. The tire of claim 12, wherein the first and the second nano-fibers are each capable of providing an adhesive force with the contact surface of between 0.01 µN and 0.20 µN.

24. A method of moving a curved surface over a contact surface comprising:
providing one or more nano-fibers disposed on the curved surface, each nano-fiber having a diameter between 50 nanometers and 2.0 microns and a length between 0.5 microns and 20 microns, and each nano-fiber capable of providing an adhesive force at the contact surface, wherein the curved surface is an annular curved surface rotatable about an axis of rotation; and
rotating the curved surface along the contact surface to cause at least one nano-fiber to adhere to the contact surface,
wherein the curved surface is configured to rotate from a first position to at least a second position,
wherein when the curved surface is in the first position, a first nano-fiber contacts the contact surface and provides an adhesive force at the contact surface, and a second nano-fiber is unattached to the contact surface, and
wherein when the curved surface rotates to the second position from the first position, the first nano-fiber is leveraged away from the contact surface, and the second nano-fiber contacts the contact surface and provides an adhesive force at the contact surface, and
wherein the first and second nano-fibers are oriented at an oblique angle other than 0 degrees and 90 degrees with respect to the annular curved surface when unattached to the contact surface and extend in the circumferential direction of the annular curved surface.

25. The method of claim 24, wherein the first and second nano-fibers each engages the contact surface first in the direction normal to the contact surface and second in the lateral direction along the contact surface.

26. The method of claim 24, wherein the first and the second nano-fibers are each capable of providing an adhesive force with the contact surface of between 0.06 µN and 0.20 µN.

27. The method of claim 24, wherein the first and second nano-fibers are each at each at an angle between 15 and 75 degrees relative to the curved surface.

28. The method of claim 24, wherein the first and second nano-fibers are each at an angle between 30 and 60 degrees relative to the curved surface.

29. The method of claim 24, wherein the first nano-fiber adheres to the contact surface at the front portion of the contact patch, and the second nano-fiber adheres to the rear portion of the contact patch.

30. The method of claim 24, wherein the plurality of nano-fibers extend from the curved surface in a single direction relative to the curved surface.

31. The method of claim 24, wherein a first group of said nano-fibers at a first region of the curved surface extends from the curved surface in a first direction relative to the curved surface, and a second group of said nano-fibers disposed on a second region of the curved surface extends from the curved surface in a second direction relative to the curved surface.

32. The method of claim 24, wherein the curved surface includes one or more raised sections, and wherein the one or more nano fibers comprise a base, and at least one said nano-fiber is disposed on the curved surface outside the raised sections such that the base of the at least one nano-fiber does not contact the contact surface during rotation.

33. The method of claim 32, wherein two said raised sections form a groove therebetween, and the at least one nano-fiber is disposed on the curved surface in the groove.

34. The method of claim 24, wherein the first and the second nano-fibers are each capable of providing an adhesive force with the contact surface of between 0.01 μN and 0.20 μN.

35. A method of making a structure for adhering to a contact surface comprising:

forming a curved surface, wherein the curved surface is configured to rotate from a first position to at least a second position, wherein the curved surface is an annular curved surface rotatable about an axis of rotation;

forming a plurality of nano-fibers having a diameter between 50 nanometers and 2.0 microns and a length between 0.5 microns and 20 microns on said surface, wherein the first and second nano-fibers are oriented at an oblique angle other than 0 degrees and 90 degrees with respect to the annular curved surface and extend in the circumferential direction the annular curved surface; and placing the plurality of nano-fibers on the curved surface, wherein when the curved surface is in the first position, a first nano-fiber of the plurality of nano-fibers contacts the contact surface and provides an adhesive force at the contact surface, and a second nano-fiber of the plurality of nano-fibers is unattached to the contact surface, and wherein when the curved surface rotates to the second position from the first position, the first nano-fiber is leveraged away from the contact surface, and the second nano-fiber contacts the contact surface and provides an adhesive force at the contact surface.

36. The method of claim 35, wherein the curved surface is a portion of a wheel.

37. The method of claim 35, wherein the curved surface is a tire.

38. The method of claim 35, wherein the first and the second nano-fibers are each capable of providing an adhesive force with the contact surface of between 0.01 μN and 0.20 μN.

* * * * *

UNITED STATES PATENT AND TRADEMARK OFFICE
CERTIFICATE OF CORRECTION

| | | |
|---|---|---|
| PATENT NO. | : 7,175,723 B2 | Page 1 of 1 |
| APPLICATION NO. | : 10/958476 | |
| DATED | : February 13, 2007 | |
| INVENTOR(S) | : Steven D. Jones et al. | |

It is certified that error appears in the above-identified patent and that said Letters Patent is hereby corrected as shown below:

Please add the following new header and paragraph after the paragraph starting at column 1, line 8, and immediately before the BACKGROUND:

-- STATEMENT REGARDING FEDERALLY SPONSORED RESEARCH

This invention was made with government support under contract N66001-01-C-8072 awarded by the Defense Advanced Research Projects Agency. The government has certain rights in the invention. --

Signed and Sealed this
Twenty-third Day of August, 2011

David J. Kappos
*Director of the United States Patent and Trademark Office*